2,721,306

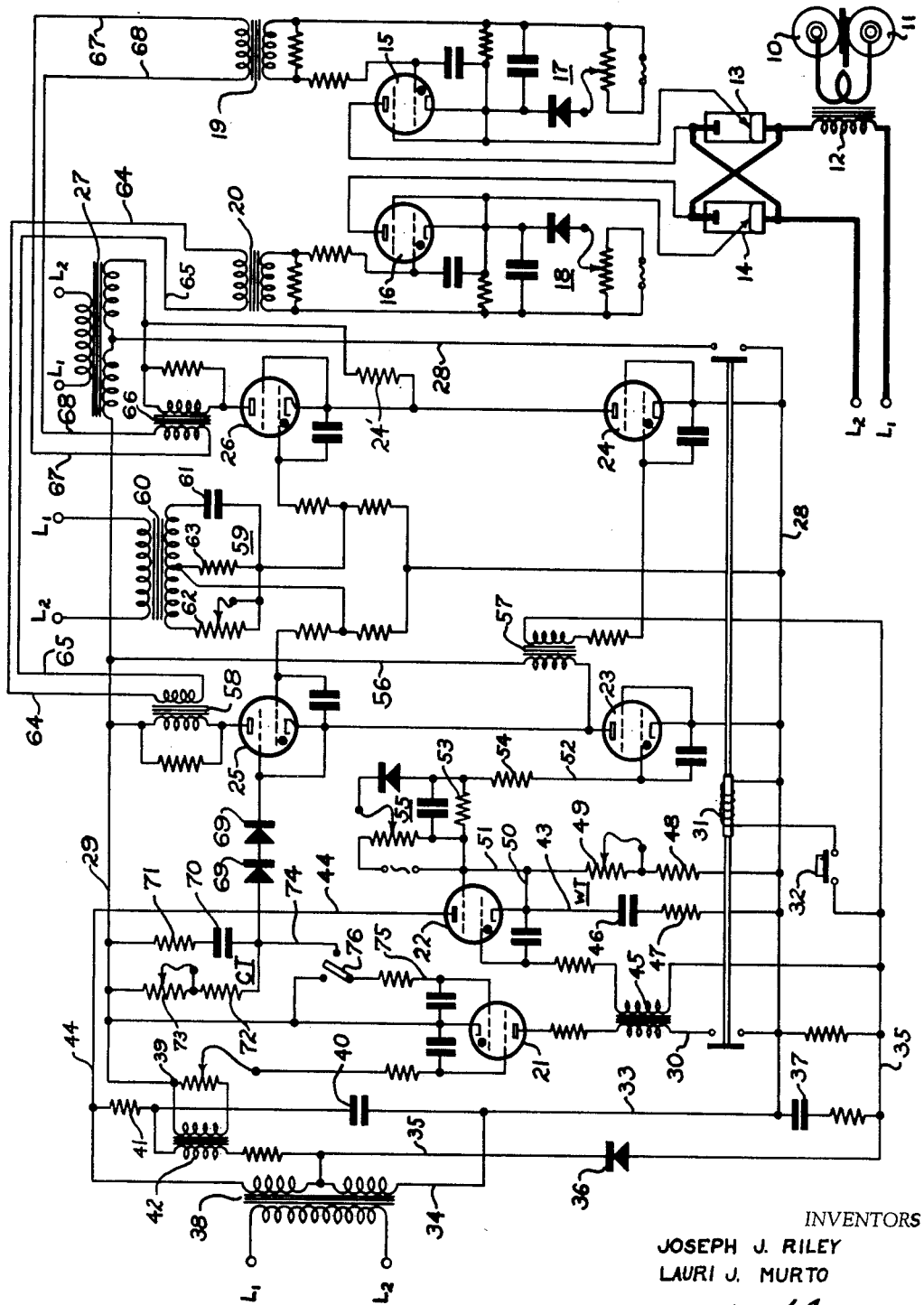
INVENTORS
JOSEPH J. RILEY
LAURI J. MURTO
BY Francis J. Klempay
ATTORNEY United States Patent Office 2,721,306
Patented Oct. 18, 1955

SYNCHRONOUS TIMING CONTROL FOR ELECTRIC RESISTANCE WELDING APPARATUS

Joseph J. Riley and Lauri J. Murto, Warren, Ohio, assignors to The Taylor-Winfield Corporation, Warren, Ohio, a corporation of Ohio Application February 11, 1953, Serial No. 336,242

12 Claims. (Cl. 323—18)

The present invention relates to control apparatus for electric resistance welding and similar apparatus, and more particularly to an improved and simplified synchronous timing control for monitoring the operation of electric resistance seam welders, for example.

It is an important object of the present invention to provide a control circuit for electric resistance welding apparatus which is characterized by exceptional reliability and dependability in controlling a plurality of repetitive operations, as in interrupted seam welding for example.

Thus, it is a specific object of this invention to provide a control circuit of the type described which is capable of timing the duration of a plurality of intermittent welding operations in such a manner that all of the plurality of welds are exactly uniform. The teachings of our present invention are particularly adapted for application in seam welding by electric resistance methods wherein the time duration of a particular weld may involve but two or three cycles of welding energy and where it s desirable to perform a plurality of welds or "stitches" along the extent of a seam. In order to obtain consistency and uniformity in welding results it is necessary that the timing control be exact since variations in, for example, one half cycle of welding energy from weld to weld may constitute relative variations of large magnitude between the welds as will be readily understood.

A concurrent object of the present invention resides in the provision of a welding control circuit having the above mentioned characteristics of accuracy and dependability which is at the same time of a highly simplex nature and thereby inexpensively assembled and easily serviced and repaired. Thus, the invention teaches a unique and highly simplified arrangement for assuring high timing accuracy and consistent timing during a welding operation comprising a plurality of intermittent welds, the said arrangement including a critical control tube or discharge device which is provided with grid signal circuitry for assuring absolutely consistent operation of the discharge device during all of a pluraltiy of intermittent welding cycles.

Yet another object of the present invention is the provision in a control circuit of the type and having the characteristics mentioned above of circuit means for controlling the duration of a weld time period, for example, in such a manner that termination of the period, or flow of weld current, is wholly independent of the firing of any discharge device or energization of a relay, for example, or any other operation or event which is of a type which may be subject to failure of occurrence, so that it is thereby assured that the weld time or other control period will not be overextended. Thus, it will appear hereafter that we may so provide my control circuit that upon the failure of any discharge device the weld time period will either not be initiated, or if initiated will time out properly or too soon so that in any event the work and/or welding apparatus will not be damaged.

Another object of the invention is the provision of a control circuit as above described, particularly for use in connection with electric resistance seam welding apparatus which is provided with simplified circuit arrangements for assuring full cyclic conduction at all times. That is, in each welding operation there will be as many half cycles of welding energy of one polarity as of the opposite polarity so that polarization or saturation of the welding transformer is thereby avoided.

And a specific object of the invention is the provision of an electronic circuit for controlling seam welder operation which is adapted with simplified and dependable circuit arrangements for effecting alternate "weld" and "cool" time periods of consistent and predetermined duration, and, alternatively, for effecting a continuous weld as may be desired.

The above and other objects and advantages of the invention will become apparent upon full consideration of the following drawing and detailed specification wherein is disclosed a certain preferred embodiment of the invention.

The single figure of the drawing is a schematic representation of an electronic control circuit for an electric resistance seam welder, which circuit embodies the various teachings of our invention.

Referring now to the drawing, the numerals 10 and 11 designate cooperating rotary electrode wheels which may be associated with conventional seam welder apparatus, not shown, whereby the electrodes may be caused to traverse the extent of a pair of overlapped workpieces while effecting the passage of welding energy therethrough as in accordance with usual welding practice. The apparatus is conventionally provided with a source of welding energy including a welding transformer 12, conductors L1 and L2 and inversely connected ignitron or arc discharge valves 13 and 14. Having direct firing control over discharge valves 13 and 14 are conventional complementary firing circuits comprising thyratron or gaseous discharge devices 15 and 16, respectively. And in accordance with usual practice discharge devices 15 and 16 have control circuitry including sources of negative biasing potential 17 and 18 and coupling transformer 19 and 20 whereby the discharge devices 15 and 16, and consequently valves 13 and 14, are rendered normally nonconductive but subject to conduction upon the impression of suitable firing signals at the transformers 19 and 20.

The above, being all in accordance with long established practice in the resistance welding art, should be distinguished from the circuitry comprising our invention which is operative in a manner hereafter to be described to impress firing signals upon the transformers 19 and 20 in an accurately controllable and dependable manner as will be understood to be desirable.

The circuit of the invention is comprised of an initiating valve or discharge device 21, a timing valve 22, a pair of coupling valves 23 and 24 connected in leading and trailing relation, and a similar pair of energy control valves 25 and 26 which are connected in series relation to the valves or discharge devices 23 and 24 whereby to be rendered conductive or conditioned for conduction subject to conduction or conditioning for conduction in the coupling valves 23 and 24, as will become apparent.

In the illustrated embodiment of the invention the initiating valve 21 is furnished with alternating anode-cathode potential by means of a transformer 27 having a center tapped secondary winding and connected at its primary to A. C. power line conductors L1 and L2. Conductors 28 and 29 connect the anode and cathode respectively of valve 21 with the center tap and left terminal of transformer 27 so that firing potential may be applied to valve 21 when conductor L1 is negative with respect to conductor L2.

Interposed in the conductor 28 and in conductor 30, connecting conductor 28 and the anode of valve 21, are normally open contacts of a switching relay 31 having an energizing circuit including a suitable initiating switch 32, such as a foot switch or a work engaging switch, for example, whereby upon the switch 32 being closed relay 34 is energized and anode potential is applied to valve 21. In the illustrated form of the invention energizing potential for the relay 31 is derived from a D. C. source including conductor 28, conductors 33, 34 and 35, rectifier 36, capacitor 37 and transformer 38 having its primary winding connected to the line conductors L1 and L2. The desired arrangement is such that conductor 35 is at a substantially constant negative potential with respect to conductor 28 so that the same source of potential may be utilized for grid bias control for certain of the valves of my circuit as will presently appear.

In accordance with the teachings of the invention the initiating valve 21 is provided with a screen grid control circuit which is referenced to cathode voltage at 39 and which includes capacitor and resistor components 40 and 41, a transformer 42 and power transformer 38 comprising a phase shifting circuit whereby a signal potential may be applied to the screen grid of valve 21 which is leading the anode-cathode potential of the valve by approximately 150 to 165 electrical degrees. The desired arrangement is such that upon application of anode-cathode potential to the valve 21 the same must begin conduction within the first 15 to 30 electrical degrees of the applied potential or not at all since after such time the signal potential at the screen grid turns to the opposite polarity to block conduction.

Connected across the secondary terminals of power transformer 38 through conductors 43 and 44 is the timing valve 22, which thus has anode-cathode potential applied continuously and in opposite phase relation to the initiating valve 21 as will be apparent from the relative orientation of the valves and respective power transformers 27 and 38 therefor, both of which transformers are connected to the line conductors L1 and L2.

For controlling the operation of timing valve 22 is the manner taught by the invention we have provided a control grid circuit therefor which is referenced to a negative biasing potential at conductor 35 and which includes the secondary winding of a transformer 45 connected in series with the anode-cathode circuit of initiating valve 21 in the manner shown. The described arrangement is such that the timing valve 22 will be maintained in a normally non-conductive state but subject to conduction during positive half-cycles of anode-cathode potential upon a proper firing signal being superimposed into its control grid circuit through the transformer 45.

Thus, when initiating valve 21 fires subsequent to energization of relay 31, transformer 45 will be energized but will merely apply an ineffective negative signal potential upon the control grid of timing valve 22. However, as the applied anode-cathode potential of valves 21 and 22 reverses valve 21 is extinguished and firing potential is simultaneously applied to timing valve 22. And by reason of the decay of current and magnetic flux in the transformer 45 a high reverse potential or inductive "kick" appears at the secondary terminals of the transformer 45 which is effective to initiate conduction in the valve 22 the instant the anode-cathode voltage thereof is sufficient to sustain conduction. This is an important feature of the present invention, as will appear, since it is thereby virtually assured that conduction in timing valve 22 will be exactly uniform in repetitive operations. Thus, while there may be minor non-uniformity in the conduction of valve 21 it is always assured that the same will conduct over a major portion of proper half-cycles of anode-cathode potential. And this in turn assures that there will be more than sufficient energy stored in the transformer 45 to provide a sharp inductive kick to the control grid of timing valve 22 whereby the latter will always begin to conduct the instant the anode-cathode potential applied thereto becomes sufficient to sustain conduction.

Connected in series with the cathode of valve 22 is a timing capacitor 46, forming a part of a timing network WT including resistors 47 and 48 and potentiometer 49, and connecting the control grid of coupling valve 23 through conductors 50—52 and resistors 53 and 54. The aforementioned components are so oriented that upon the capacitor 46 being charged a positive control potential will be applied to the grid of valve 23. A source of negative biasing potential 55 connects the terminals of resistor 53 whereby to provide a blocking bias independent of the timing capacitor 46 and operative except when the capacitor is charged to a predetermined potential to maintain valve 23 in a non-conducting state. As will hereafter be apparent, we may utilize the capacitor 46 with advantage to time the duration of a welding operation by regulating the time period wherein, while capacitor 46 discharges through network WT, the terminal potential thereof sufficiently overcomes the blocking bias on valve 23 to maintain the latter in a conductive state.

Coupling valve 23 is connected across conductors 28 and 29 by means of a plurality of circuits one of which includes conductor 56 and transformer 57, the arrangement being such that anode-cathode potential is applied to valve 22 and 23 in the same polarity. Accordingly, upon the firing of valve 22, accompanied by the substantially instantaneous charging of the series connected timing capacitor 46, valve 23 will be rendered conductive simultaneously therewith.

Connected in series with the anode of valve 23, and constituting another of the plurality of circuits connecting the last mentioned valve with conductor 29, is energy control or "heat" control valve 25 and an impulse transformer 58 which components are adapted to be energized during conduction in coupling valve 23, and at no other times. In accordance with the desired operation of the control circuit, heat control valve 25 is of a type having a control grid and is provided with a control grid circuit referenced to a slight negative bias, i. e. the arc drop of valve 23, at conductor 28 and including a positive potential signal generator 59 having phase shifting components therein. The signal generator 59 is of a conventional asembly, comprising a transformer 60, capacitor 61, potentiometer 62, and a resistor 63 connecting a center tap of the transformer 60 and one terminal of each the capacitor 61 and potentiometer 62, so that a signal voltage is derived across the terminals of the resistor 63 which is in predetermined but variable phase relationship with the input potential to transformer 60, such input potential in the present instance being taken from line conductors L1 and L2. The described arrangement is such that upon firing of coupling valve 23 and consequent conditioning of heat control valve 25 for conduction the latter valve will conduct at such time as the phase-related control signal from generator 59 causes a positive control potential to be applied. As will be readily understood, this may occur at any time during the half cycle during which valve 23 conducts, and the valve 25 will continue to conduct for the remaining portion of such half cycle.

Conduction in valve 25 will, of course, cause transformer 58 to be energized, and by means of conductors 64 and 65 transformer 20 is simultaneously energized applying firing potential to discharge device 16, and thereby to discharge device 14.

As a sometimes preferred alternate arrangement the signal generator 59 may be arranged to employ a suitable transformer, not shown, in place of resistor 63. And in some instances the use of hold-off bias in connection with the signal generator 59 may not be required.

Connected between conductor 28 and the right terminal of power transformer 27 are coupling valve 24, heat control valve 26 and impulse transformer 66, which last mentioned components are connected in series relation, as shown, and arranged to proper anode-cathode potential will be applied to the valves 24 and 26 in alternate relation to that applied to complementary valves 23 and 25 heretofore described.

Coupling valve 24 is provided with a control grid circuit referenced to a negative biasing potential at conductor 35 and including transformer 57 in the anode circuit of coupling valve 23. Thus, upon termination of conduction in valve 23 at the end of certain half cycles of anode-cathode voltage there will be a decay of current and magnetic flux in transformer 57 which, by means of an inductive kick, will cause a firing control signal to be applied to valve 24 during the following half cycle of potenial. Accordingly, during all of such following half cycle valve 24 will conduct through a circuit including resistor 24', causing anode-cathode potential to be applied to valve 26.

Valve 26, as corresponding valve 25, is provided with a control grid circuit including a negative biasing reference at conductor 28 and the above described variable-phase signal generator 59 which is arranged to apply a firing signal to valve 26 at the same point in the anode-cathode potential cycle as such signal is applied to valve 25.

Upon conduction in valves 24 and 26 transformer 66 is energized, and simultaneously therewith transformer 19 is energized through conductors 67 and 68. Discharge devices 15 and 13 are energized or rendered conductive as a direct result of the energization of transformer 19 as will be readily understood.

Also connected in series with the first mentioned coupling valve 23, and forming yet another of the plurality of circuits connecting the same with conductor 29 is a circuit comprising rectifier units 69, and a timing network CT comprising a capacitor 70, resistors 71 and 72 and a potentiometer 73. The arrangement is such that immediately upon conduction in the coupling valve 23 capacitor 70 charges through rectifiers 69 so that the lower terminal of the capacitor 70 is substantially negative with respect to conductor 29.

By means of conductors 74 and 75 and a suitable switch 76 the lower terminal of capacitor 70 may be connected to the control grid of the initiating valve 21 to render the same non-conductive. After conduction in valve 23 is terminated the charge on capacitor 70 will be dissipated at a predetermined rate through resistors 71 and 72 and potentiometer 73 and a predetermined time later valve 21 will again be rendered conductive. The time relay period thus afforded is known as "cool time" and is desired in certain seam welding operations wherein spaced welds or "stitches" are made intermittently across the surface extent of a pair of workpieces to be joined.

In the overall operation of the circuit described above a welding operation is initiated by closing of switch 32 and consequent energization of relay 31. At the next subsequent complete half cycle of anode-cathode potential of proper polarity initiating valve 21 will be rendered conductive. And it will be understood that this valve will conduct over substantially the full half cycle or not at all due to the phase-displaced control signal applied to the screen grid thereof by transformer 42.

At the end of the first half cycle of conduction of valve 21 a highly positive control potential will be applied to the control grid of timing valve 22 by the inductive reaction of transformer 54, and accordingly, valve 23 will be rendered conductive during the following half cycle of potential as applied at the line conductors L1 and L2.

Substantially instantaneously with the initiation of conduction in valve 22 timing capacitor 46 charges and thereby applies a positive control grid potential to valve 23, which valve accordingly fires simultaneously with timing valve 22.

In addition to other effects, the firing of valve 23 causes capacitor 70 to become charged thereby, assuming switch 76 to be set at its right hand contact, applying a blocking potential to the initiating valve 21. And it will be understood that the above effects all take place in the half cycle next following the first half cycle of conduction in valve 21 so that in the normal operation of the control circuit valve 21 conducts for but a single half cycle for each welding operation.

Upon initiating valve 21 being rendered non-conductive timing valve 22 is also rendered non-conductive due to the absence of a firing signal from transformer 45, and accordingly timing capacitor 46 begins to discharge through the timing network WT and at a rate determined by the setting of potentiometer 49.

Coupling valve 23 is of course conditioned for conduction as long as there is sufficient charge on the timing capacitor 46 and will, therefore conduct during half cycles of the correct polarity during such time, rendering heat control valve 25 also conductive during such half cycles or such portions thereof as may be determined by the setting of potentiometer 62 in the phase-shifting network 59.

Through control impulses from transformer 57 valve 24 is conditioned for conduction in trailing relationship to valve 23. And this function also serves to condition valve 26 for conduction over such portions of trailing half cycles of potential as may be determined by potentiometer 62, it being understood, of course, that the firing of valves 25 and 26 will be balanced at all times due to the common grid control arrangements therefor including reference potential at conductor 28 and a common phase shift circuit 59.

Welding at electrodes 10 and 11 will take place upon conduction in valves 25 and 26 as heretofore explained, and for such portions of cycles only as the valves 25 and 26 are conducting. Therefore, the energy level at which welding will take place may be readily regulated by suitable adjustment of potentiometer 62. And it will be further understood that welding will always take place in full-cycle increments since firing of valve 23 to effect conduction in weld valve 14 will of necessity be followed by firing of valve 24 to effect conduction in weld valve 13.

The welding period is terminated a predetermined time after its initiation by discharge of capacitor 46, through network WT, to such an extent that the blocking bias from source 55 overcomes the positive signal provided by the capacitor 46. And it will be understood that the discharge time of capacitor 46, and accordingly the weld time period, will be uniform time after time in repeat operations since uniform charging of the capacitor is virtually assured by our unique arrangement for triggering the timing valve 22.

When coupling valve 23 is blocked after dissipation of the sustaining potential therefor from capacitor 46, "cool time" capacitor 70 begins to discharge through network CT. And as it does so, the biasing potential on the control grid of initiating valve 21 is progressively reduced to the potential of the cathode thereof, at which time the initiating signal impressed on the screen grid of the valve from transformer 42 initiates ocnduction and a new weld cycle is begun. Alternate "weld" and "cool" time periods as above described will continue until such time as the initiating switch 32 is opened, which may be accomplished manually or automatically as may be desired under the circumstances of use. It is contemplated, of course that during operation of the circuit the welding electrodes 10 and 11 will traverse the work to be welded so that the completed overall operation will produce a plurality of spaced welds or stitches, each of a highly uniform nature as will be understood.

In some types of seam welding it may be desirable to sustain the flow of weld current in electrodes 10 and 11 during the entire traverse of the work. And for this purpose I have provided the switch 76 with a left hand contact whereby the control grid of initiating valve 21 may be connected directly to its cathode. As will be apparent, with the circuit so arranged the valve 21 will conduct during all half cycles of the proper polarity, as will timing valve 22 which is coupled thereto, so that the timing capacitor 46 is maintained in a fully charged condition. Thus the only control over the welding operation, other than regulation of the heat or energy level at the phase shifting network 59, is provided by the initiating switch 32. The machine operator may, therefore, energize and deenergize the apparatus as he deems necessary or desirable, or suitable automatic means such as work sensing devices may be employed to energize the apparatus upon the electrodes 10 and 11 being properly oriented with respect to work to be welded.

The advantages of the invention should now be manifest. The circuit is of a highly simple nature, operating directly from an alternating current source, so that a minimum of components, particularly electronic discharge devices, are required. Maintenance and repair of the circuit, when necessary, is thus facilitated, and may be carried out without the aid of special electronics technicians as has heretofore been required in many instances.

Perhaps the most important single feature of our invention resides in our novel circuit arrangement, including initiating valve 21 and timing valve 22, for insuring accurately uniform charging of timing capacitor 46 time after time in repetitive operations. Thus, the triggering arrangement for valve 21 may permit minor variations in the periods of conduction of valve 21, but it is certain that this valve will conduct over a major portion of the half cycle even though the portion may vary from time to time. This feature, in turn, insures that the transformer 45 will, without fail, be charged or energized sufficiently so that upon termination of conduction in valve 21 a relatively high potential starting signal is applied to the control grid of valve 22 causing the same to conduct as soon as the applied anode-cathode potential is sufficient to sustain conduction. This will, of course, be substantially uniform in repeated operations and the capacitor 46 will accordingly be charged uniformly each time.

Another important feature of the invention resides in our novel arrangement of components for timing the duration of the weld time period whereby this period will not be over-extended by reason of failure of a discharge device to fire, for example. As will be readily appreciated electric discharge devices of the type herein contemplated are subject to unexpected failure after long periods of use. And thus where the control arrangement provides for ending the flow of weld current by the firing of any discharge device, as in conventional "flip-flop" arrangements, for example, the weld will be overextended upon failure of the device to fire as contemplated, and damage to the work and/or machine may result. This is substantially precluded in our circuit wherein, upon failure of any discharge device to conduct as intended, the weld time period will either not begin, or if previously begun will time out properly or prematurely, the worst possible consequence being an imperfect weld. Thus, it will be observed in the illustrated circuit that the coupling valve 23, which must conduct during welding, operates when conducting to charge capacitor 70 and extinguish initiating and timing valves 21 and 22. Also, initiaton of conduction in valve 23 is effected by charging of capacitor 46 which in discharging, which it necessarily must do if valve 23 conducts, extinguishes valve 23 after a predetermined time.

Having thus described our invention in one of its preferred embodiments, and explained certain of its important advantages, what we claim as new and desire to secure by Letters Patent is:

1. Circuit apparatus for timing the duration of the flow of welding current in electric resistance welding apparatus comprising a source of alternating current energy, an initiating valve having an anode, cathode and grid electrode, means ot connect said anode and cathode to said source, means comprising said source and phase shifting means to impress a control potential on said grid electrode which leads the anode-cathode potential derived from said source by in the order of 160 electrical degrees whereby said initiating valve, when conditioned for conduction, will conduct over substantially the whole of the half cycles in which it conducts, a transformer connected in series with said initiating valve, a timing valve connected across said source in anti-parallel relation to said initiating valve, said timing valve having a grid electrode and means to maintain a negative control bias on said electrode, said transformer being connected in series with said last mentioned grid electrode and so oriented that upon termination of conduction in said initiating valve a high positive control signal is applied to said last mentioned grid electrode, and a timing capacitor connected in series with said timing valve and adapted to be charged thereby.

2. Circuit apparatus for timing the duration of the flow of welding current in electric resistance welding apparatus comprising a source of alternating current energy, an initiating valve connected across said source, a transformer connected in series with said initiating valve, a timing valve connected across said source in anti-parallel relation with said initiating valve, said timing valve having a grid electrode and a control circuit therefor including a source of negative biasing potential and said transformer, said transformer being so oriented in said circuit that upon termination of conduction in said initiating valve said transformer causes a positive control potential to be applied to said grid electrode, a timing capacitor connected in series with said timing valve and adapted to be charged thereby, and control means for said initiating valve for initiating conduction therein, said control means being operative to initiate conduction only during predetermined portions of half cycles of anode-cathode potential applied to said initiating valve from said source.

3. Circuit apparatus for timing the duration of the flow of welding current in electric resistance welding apparatus comprising a source of alternating current energy, a timing capacitor, a timing valve operative when conducting to charge said capacitor, said timing valve having a grid electrode and circuit means therefor including a source of biasing potential for maintaining said timing valve non-conductive, means for causing conduction in said timing valve comprising an initiating valve connected in anti-parallel relation to said timing valve, reactive means associated with said initiating valve and said grid electrode whereby upon termination of conduction in said initiating valve a transient signal is impressed upon said grid electrode tending to overcome said biasing potential, and means for controlling conduction in said initiating valve, said last mentioned means being operative to insure conduction in said initiating valve over predetermined minimum portions of a half cycle of applied anode-cathode voltage whereby said transient is of sufficient magnitude to insure conduction in said timing valve upon the anode-cathode potential applied thereto becoming sufficient to sustain conduction.

4. Apparatus according to claim 3, further characterized by said initiating valve having a grid electrode, and said last mentioned means comprising a source of control potential for said last mentioned grid electrode, said source including phase shifting means whereby said control potential leads the anode-cathode potential for said initiating valve by in the order of 160 electrical degrees, the arrangement being such that said initiating valve begins conducting during the initial portions of half cycles of anode-cathode potential or not at all.

5. Apparatus according to claim 3 further including a coupling valve connected to said source and adapted to conduct in response to the existence on said timing capacitor of a charge of predetermined potential, a weld contactor associated with said coupling valve and adapted to be energized to permit the flow of welding energy when said coupling valve is conducting, and means associated with said coupling valve operative in response to conduction therein to cause said timing capacitor to discharge at a predetermined rate.

6. Apparatus according to claim 5 further characterized by said means associated with said coupling valve including a second capacitor adapted to be charged by conduction in said coupling valve, circuit means associated with said capacitor and initiating valve for preventing conduction in said initiating valve upon charging of said second capacitor, and a discharge path for said second capacitor including a potentiometer whereby a predetermined time delay period after termination of conduction in said coupling valve said initiating valve will be rendered conductive.

7. Circuit apparatus for timing the duration of the flow of welding current in electric resistance welding apparatus comprising a source of alternating current energy, a weld contactor, a timing capacitor, means to charge said timing capacitor including an initiating valve, means to energize said contactor including a coupling valve, said coupling valve being connected to said source and rendered conductive in response to the existence on said capacitor of a charge of predetermined minimum potential, said capacitor being charged in response to conduction in said initiating valve, means operative in response to conduction in said coupling valve to render said initiating valve non-conductive, and a discharge path for said capacitor including a potentiometer whereby the charge on said capacitor may be dissipated when said initiating valve is non-conductive.

8. Apparatus according to claim 7 further characterized by said weld contactor comprising a pair of electric discharge devices connected in anti-parallel relation, one of said discharge devices being energizable in response to conduction in said coupling valve, and said apparatus further including a second coupling valve, the other of said discharge devices being energizable in response to conduction in said second coupling valve, said coupling valves being connected in anti-parallel relation, and control means for said second coupling valve associated with said first mentioned coupling valve whereby conduction in said second coupling valve is conditioned upon and responsive to prior conduction in said first mentioned coupling valve.

9. Circuit apparatus for timing the duration of the flow of welding current in electric resistance welding apparatus comprising a source of alternating current energy, a timing valve, a timing capacitor connected in series relation to said valve and adapted to be fully charged thereby upon conduction in said timing valve for a half cycle period of said source, said valve including a grid electrode, means including a reactance element for applying a firing signal to said grid electrode to initiate conduction in said valve, said reactance element being operative to apply said signal in response to the decay of current flowing therein during the half cycle next preceding said half cycle period, and means to insure the flow of current in said reactance element for a predetermined minimum portion of said half cycle.

10. Apparatus according to claim 9 further including a weld contactor, and means to energize said contactor in response to the existence on said capacitor of a charge predetermined minimum potential, a discharge path for said capacitor including a potentiometer, and means operative in response to the existence of said charge to cause said capacitor to discharge through said path.

11. Apparatus according to claim 10 further characterized in that said means to energize and said last mentioned means comprises a discharge device adapted to conduct responsive to the existence of said charge.

12. Apparatus according to claim 9 further characterized by said means to insure the flow of current in said reactance element comprising an initiating valve connected across said source and having a grid electrode, means to apply a control potential to said grid electrode comprising a phase shifting network, the arrangement being such that said initiating valve conducts during minimum portions of half cycles of anode-cathode potential or not at all.

References Cited in the file of this patent

UNITED STATES PATENTS 2,508,467     Parsons _____ May 23, 1950